US011586916B2

(12) United States Patent
Fong

(10) Patent No.: US 11,586,916 B2
(45) Date of Patent: Feb. 21, 2023

(54) AUTOMATED ML MICROSERVICE AND FUNCTION GENERATION FOR CLOUD NATIVE PLATFORMS

(71) Applicant: EMC IP Holding Company LLC, Hopkinton, MA (US)

(72) Inventor: Victor Fong, Medford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 402 days.

(21) Appl. No.: 16/776,961

(22) Filed: Jan. 30, 2020

(65) Prior Publication Data

US 2021/0241088 A1 Aug. 5, 2021

(51) Int. Cl.
*G06N 3/08* (2006.01)
*G06N 3/04* (2006.01)

(52) U.S. Cl.
CPC ................ *G06N 3/08* (2013.01); *G06N 3/04* (2013.01)

(58) Field of Classification Search
CPC ........... G06N 3/08; G06N 3/04; G06N 20/00; G06N 5/046
USPC ..................................... 707/725; 706/21, 11
See application file for complete search history.

(56) References Cited

U.S. PATENT DOCUMENTS

2019/0108417 A1* 4/2019 Talagala .................. G06N 5/04
2019/0377984 A1* 12/2019 Ghanta ................ G06K 9/6262
2020/0074318 A1* 3/2020 Chen .................... G06N 3/0445
2020/0303060 A1* 9/2020 Haemel .................. G16H 40/63
2021/0192394 A1* 6/2021 McKay .................. G06N 20/00

* cited by examiner

*Primary Examiner* — Evan Aspinwall
(74) *Attorney, Agent, or Firm* — Workman Nydegger

(57) ABSTRACT

One example method includes receiving, as an input, an ML pipeline definition, identifying a group of layers required to be created for the ML pipeline definition, for one of more of the layers, receiving input concerning one or more characteristics of the layer, creating the layers for which input has been received, and packaging the created layers with the ML pipeline definition to create a production-ready ML model.

20 Claims, 6 Drawing Sheets

AUTOMATED ML MICROSERVICE AND FUNCTION GENERATION FOR CLOUD NATIVE PLATFORMS

FIELD OF THE INVENTION

Embodiments of the present invention generally relate to machine learning. More particularly, at least some embodiments of the invention relate to systems, hardware, software, computer-readable media, and methods for preparing a machine learning (ML) model for use in a production environment.

BACKGROUND

Machine learning (ML) models may be created for a variety of different applications and circumstances. However, even after data scientists finish designing and validating ML models, the models are not yet ready for production usage. There remains a need to develop microservices and functions that can accept and transform live data, make predictions, and train continuously. Furthermore, these microservices need to be robust and scalable, so that they can handle a high amount of traffic.

Developing such ML-based workloads is often a time-consuming task, and there are often multiple areas of expertise involved, including Artificial Intelligence Markup Language (AIML), software development, Continuous Integration/continuous Delivery (CI/CD), database, infrastructural operation and scheduling. This process would often require cross-team collaboration, and often months would be spent prior to a ML model being production ready.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
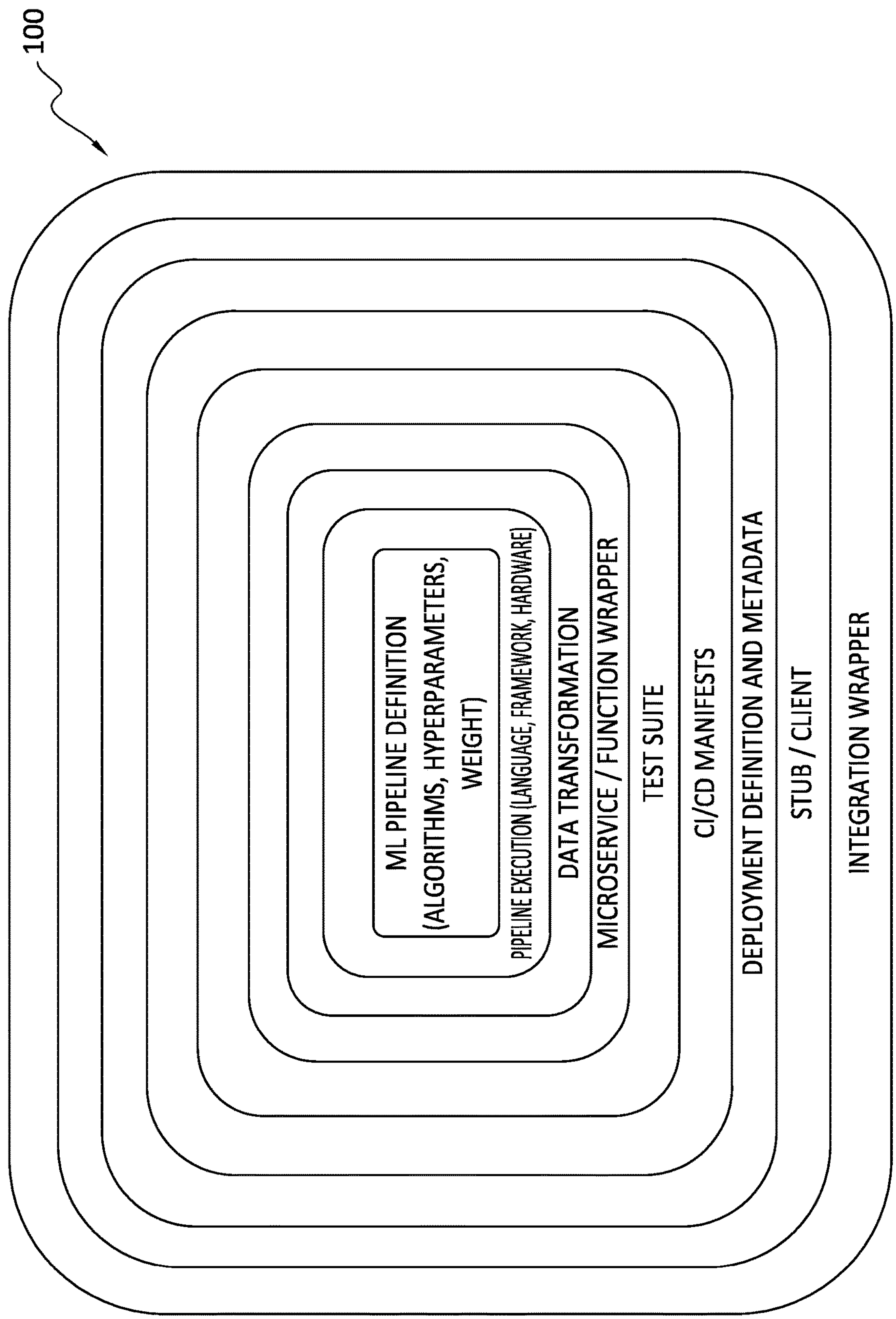
FIG. 1 discloses aspects of an example layer development scheme.

Embodiments of the present invention generally relate to machine learning. More particularly, at least some embodiments of the invention relate to systems, hardware, software, computer-readable media, and methods for preparing a machine learning (ML) model for use in a production environment.

Note that as used herein, a 'production environment' refers to a computing environment in which actual customer data, rather than test data, is being handled. Thus, example embodiments of the invention may operate in connection with customer data in computing environments such as a cloud native platform for example. The scope of the invention is not limited to cloud native platforms however.

A variety of processes may be involved in the development of a microservice for use by an ML model in connection with one or more use cases in a production environment. Such processes may include, for example, ML design and model hand-off from data scientists, microservice design, microservice development, testing, runtime environment planning and allocation, deployment, and scheduling and scaling. In general, example embodiments of the invention embrace, among other things, a layer-based code and artifact generation mechanism that may generate each of the layers required by a microservice/function of an ML use case. An embodiment of the invention may automatically turn any ML model into a fully functional, robust and scalable microservices and/or functions ready for production, along with CI/CD and deployment artifacts to eliminate manual work along with the software development journey. Furthermore, the workloads that are generated may be annotated with metadata corresponding to the ML model, to simplify intelligent scheduling at runtime development.

Thus, embodiments of the invention may implement a variety of functions. Such functions may include, but are not limited to, code and artifact generation for ML use cases, metadata generation for intelligent scheduling, automated transformation for ML models across execution platforms, automation of Enterprise Resource Planning (ERP) system integration, and coding an ML-service factory rather than coding individual services. Additional, or alternative, functions may be implemented by yet other embodiments of the invention.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of at least some embodiments of the invention is that an embodiment may automate the transformation of an ML model into a group of production-ready microservices and/or other functions. As another example, an embodiment of the invention may annotate ML related workloads with metadata so as to simplify intelligent scheduling at runtime development. Finally, an embodiment of the invention may enable relatively fast, effective, and efficient deployment, in a production environment, of microservices needed to support an ML process. Various other advantages of some embodiments are disclosed elsewhere herein.

A. Overview

Following is a brief overview of some contextual information concerning various embodiments of the invention. Modern software architecture divides software components into microservices and functions, each with its own responsibilities and API. For applications with ML capabilities, an industrial best practice may be to define a microservice or function to only embed one ML models for a specific functionality, so that the ML-based microservice or function can enjoy the benefit of cloud native architecture, such as horizontal scalability, and independent deployment and maintenance.

However, the process of turning a defined ML model into production-ready microservices or functions can be very time-consuming. For example, and with reference to the development scheme 100 of FIG. 1, it can be seen that the ML pipeline, such as may be defined by data scientists, is but one element of a complex process involving multiple entities and functions, all of which may have to be satisfactorily completed before the ML model is production-ready. As indicated in FIG. 1, each of the layers may be related to one or more preceding layers, and one or more succeeding layers, although all of the layers center on the defined ML pipeline. The relations between layers may take the form of dependencies such that, for example, as between two layers, the innermost layer must be completed before the outermost layer can be completed. In the example development scheme 100 of FIG. 1, all of the layers center on the ML pipeline initially defined by data scientists or others.

As shown in FIG. 1, the example development scheme 100 may comprise the following layers: 1. ML Pipeline Definition—algorithms, hyperparameters, weights; 2. Pipeline Execution—programming language runtime, framework, and hardware orchestration; 3. Input/output data transformation; 4. Microservice/Function wrapper—HTTP server, pub/sub, function Application Program Interface (API); 5. Test Suites—unit tests, acceptance tests, and integration tests; 6. CI/CD Manifests—definition of each CI/CD stage according to the tool used, such as Concourse, or Jenkins, for example; 7. deployment definition and metadata—7a. Deployment definition (such as Kubernetes, Mesos, or Cloud Foundry, for example), 7b. Data service orchestration (such as object-storage, or database access, for example), 7c. Scheduling metadata (such as GPU-required, or memory-optimized, for example); 8. Stub/Client—Libraries that can invoke the microservice or function natively; and, 9. Integration Wrapper—Native software components that can be inserted into ERP systems and COTS products to integrate with AI/ML functionality.

While, as indicated in FIG. 1, the ML pipeline definition is the core of the microservices or functions, the production journey is far from over after the data scientists finish their work on the ML pipeline definition. The rest of the layers may have to be created by DevOps engineers or others. Currently, creation of those layers may be a time-consuming and error-prone process, which may take months to complete, and which may require a high level of coordination among the creators of those layers.

It will be apparent from FIG. 1 that if when transforming an ML model or function into a production-ready deployment, possibly by way of the development scheme 100, various problems may conceivably be encountered. For example, software development around AI/ML use cases may be time consuming. As noted earlier herein, there may be many processes still be to be performed after the ML model is complete. These processes may not only consume significant time and cost, but may slow the progression of an enterprise in its process of implementing AI/ML, ultimately reducing the competitive edge of the enterprise.

As another example, IT departments of enterprises may need to set standards for the software generated by those enterprises, where such standards may include best practices, and security and compliance measures, for example. However, such standards may be difficult to train and enforce throughout an enterprise that may employ thousands of developers.

Further, while some pre-packaged AI/ML platforms may be available to prepare an ML model for deployment to a production environment, the algorithms generated by these platforms are often black-boxes that downstream developers cannot modify. Furthermore, these platforms may not only require a high license fee, but they are also locked into specific vendors. For example, some solutions may require a specific cloud service provider to run the ML-model, like AWS, some require the data to be stored in specific database, such as Oracle. This vendor lock-in not only prevents an enterprise from moving to other AI/ML solution, but may also require the enterprise to execute the workloads in a specific environment and infrastructure, resulting in unnecessary license and hosting fees. Thus, there may be significant barriers and disincentives attending the use of a black box AI/ML product.

Another problem that may be encountered concerns integration with existing systems. For example, integrating AI/ML capabilities into an existing ERP system may be time-consuming, as this procedure can require a specific set of skills, and ERP systems are typically locked down by the IT department of the enterprise. As well, the coding standard and pattern required by each ERP system may vary from one ERP system to another. From a resource allocation perspective, even after a development team has finished developing a ML-based microservice or function, the team may still need to wait for an IT developer to pick up the work and develop custom code to insert, that is, integrate, the new behavior into ERP systems.

Finally, it may be difficult to orchestrate ML workloads on optimal hardware. For example, there may be disconnects between the data scientists, developers, and operators, as each group of users have a different set of expertise. In circumstances such as these, it may be difficult for an ML-pipeline to be executed on the optimal hardware, because this optimization requires knowledge of existing IT environment, available hardware and infrastructure, algorithm level knowledge, and software knowledge. In most enterprises, the discussion is often case-by-case, which may require a lot of time. Furthermore, in some enterprises, the same environment may be used for all microservices and functions, which can lead to unnecessary cost or sub-optimal performance.

A. Aspects of Some Example Operating Environments

Devices in an operating environment for one or more embodiments of the invention may take the form of software, physical machines, or virtual machines (VM), or any combination of these, though no particular device implementation or configuration is required for any embodiment.

Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

C. Aspects of Some Example Embodiments

With the preceding discussion in view, attention is directed now to aspects of some example embodiments of the invention. For example, some embodiments of invention comprise a layer-based (see FIG. 1) code generation tool that may automatically turn ML pipelines into production-ready microservices or functions, capable of executing in environments such as, but not limited to, a cloud-native infrastructure.

C.1 Inputs.

In general, an input to a process according to some embodiments of the invention may be, for example, an ML pipeline definition, which may have been generated by data scientists, or automated ML frameworks, and/or other development sources. The output of such a process may be, for example, a microservice or a function, with code, artifacts, and/or binary ready for execution on in a production environment, such as a cloud-native infrastructure for example. This output may form a baseline that DevOps engineers and/or others may continue to develop and customize on, without being locked into an arrangement with any vendor. Furthermore, enterprises may customize the template used by each layer, so that a factory of AI/ML workload may be created to best fit the unique preference and orchestration needs of each enterprise.

In some embodiments, there may be two categories of input to processes such as those just noted, namely, (i) ML pipeline definition, and (ii) generation preferences for each layer. In other embodiments, additional or alternative inputs may be employed. Each of the foregoing example inputs is discussed in turn below.

C.1.1 ML Pipeline Definition

As noted above, the ML pipeline definition may be defined by data scientists and/or generated by an automatic ML framework, for example. In some embodiments, the ML pipeline definition may be input in a format, such as binary, text, JavaScript Object Notation (JSON), as defined herein. In the event that a user would like to be able to port the ML pipeline across programming languages, which may include Python, Go, and Java, for example, and across frameworks, which may include Tensorflow, sk-learn, and LGBM, for example, an understanding of the construct of the ML pipeline, including the algorithms, hyperparameters, and weights, may be needed.

On the other hand, if a user would like to provide the ML pipeline as a black-box, such as Python pickle dump, or Keras dump, for example, embodiments of the invention would still provide flexibility on the layers not included in the black-box. Note that, depending upon the embodiment, additional functionality may also be implemented to extract information from the dumps to provide additional flexibility of porting from one framework to another.

C.1.2 Generation Preference of Layers

Depending on the particular embodiment, the layers, such as those disclosed in the example of FIG. 1, may each include their own respective options. Depending on the pipeline definition, that is, the configuration of the pipeline that will be used, one or more of these options may be enabled or disabled. The options of each layer may have a dependent relation with each other. To illustrate, if a framework is not implemented/available in a particular language, the option for implementation in that language may be disabled. The input concerning the various options for each layer may be collected in a user-friendly manner. Implementation may include organizational default settings, without actual user input, such as, but not limited to, graphical user interface (GUI), and the human-readable 'Yaml Ain't Markup Language' (YAML) config.

As embodiments of the invention may be template based, each enterprise may be able to define its own option according to its IT setting and preferences, and ERP landscape. Also, new sections may be defined by template customization. Based on configuration, different options may be available for different teams. For example, Kubernetes may be available for development Team A, but KNative may be available for development Team B. As well, the IT department of an enterprise may also provide default settings, so that all microservices and functions generated within that enterprise may be uniform across the entire organization.

With continued reference now to the example of FIG. 1, details are provided concerning implementation of each of the layers in accordance with one or more embodiments of the invention. These layers are addressed beginning with the pipeline execution layer, and moving outward. In the following discussion, it is assumed that the core element, that is, the ML pipeline definition, has already been created by data scientists and/or others. As explained below, one or more of the layers may be associated with a respective group of one or more user-selectable options that may be used to define a configuration of the layer. Layers are not necessarily required to have any such options and, in some cases, one or more layers may not have any user-selectable options.

PIPELINE EXECUTION. This layer defines the core of the pipeline execution mechanism and may embrace, for example, language, a framework, and hardware. Depending on the embodiment, the options that may be defined and specified by a user or developer for this layer may include: (i) programming language and runtime—Python, Java, or Go, for example; and (ii) framework of pipeline/algorithm—sk-learn, Keras, Pytorch, or Tensorflow, for example. Depending on the ML-pipeline definition and implementation available, availabilities of different options may be toggled between options.

INPUT/OUTPUT DATA TRANSFORMATION. In some embodiments, there may be no options that can be specified for this layer. In such embodiments, the generated code may simply be a pass-through based on input dimension defined by the ML pipeline definition.

MICROSERVICE/FUNCTION WRAPPER. Since this wrapper may be dependent on the platform and invocation mechanism, the user may have to provide some infrastructural settings prior to choosing the actual format of the wrapper. Such settings may comprise the following, and may be selected in the indicated order: (i) inference deployment platform—for example, Kubernetes, Knative, Cloud Foundry, and AWS Lambda; (ii) training deployment platform—for example, Kubernetes, and Dask Cluster; and, (iii) invocation mechanism—for example, RESTful API (Representational State Transfer), Pub/Sub, and RabbitMQ. Based on the selections for these settings, one or more wrapper options may then become available. Furthermore, if the user has chosen, for example a FaaS deployment platform, wrapper options for functions may be available. If a microservice platform is chosen, based on language chosen previously, wrapper options may be available. Such wrapper options may include, but are not limited to, Flask (Python, and HTTP), or Spring Boot (Java, and RabbitMQ).

TEST SUITES. In this section, the user may select various options based on the settings selected previously for one or more of the other layers. The user-selectable options for this layer may comprise: a testing framework; and, a test suite level—for example, unit test, integration test, acceptance test, or all tests.

CI/CD MANIFEST. In this section, the user may select which CI/CD tool would be used, where examples of such tools include Concourse, and Jenkins.

DEPLOYMENT DEFINITION AND METADATA. For this layer, the user may provide input as to where the ML model will be stored. For example, the weights and model may be hardcoded, and then stored within the microservice/function container, or stored externally in a database or object storage. The user may also specify where a training dataset will be stored, so that the ML model may be trained and updated continuously in an automated fashion, using the training dataset. As well, the metadata of the deployment may be generated based on the ML pipeline definition, but the user may also be able to provide custom configuration in this section.

STUB/CLIENT. The user may be able to specify the language which the client should be generated in, such as Go, Python, or Javascript, for example. Depending on the embodiment, the additional option of framework used may also be available for this layer, where this framework option may be based on the previous selection, that is, the specified language, such as JQuery, or Java HTTPClient, for example.

INTEGRATION WRAPPER. Finally, and depending on the integration target, different options may be made available. Such options may include, for example, the respective integration wrappers provided by SAP (https://www.sap.com/index.html), and IBM (https://www.ibm.com/us-en/?ar=1).

C.2 Layer Generation.

In at least some embodiments, any one or more of the layers disclosed in FIG. 1, and discussed further in connection with FIG. 2 below, may be generated based on respective pre-defined templates. The users may also customize these templates according to their preference and needs. The generation of the layers may be implemented by any suitable templating language.

According to the ML pipeline definition, metadata may also be generated. Depending on the deployment platform, the generated metadata would be stored in a deployment manifest accordingly. For example, if the algorithm used is TensorFlow and the workload will be running on GCP Kubernetes service, then the deployment manifest would include orchestration of TPU to the container.

These metadata may be defined by templates and/or by algorithm, so that pre-defined recommendations may be made by machine learning and infrastructure experts. Furthermore, metadata definition may be implemented at an enterprise level, without requiring operators and developers to have any particular expertise.

Finally, the generated implementation may also include a microservice which can be used for training. The training and inference microservices may be deployed independently of each other, with an updated ML model being populated in the inference microservices or functions once available.

Output.

Figure 2:
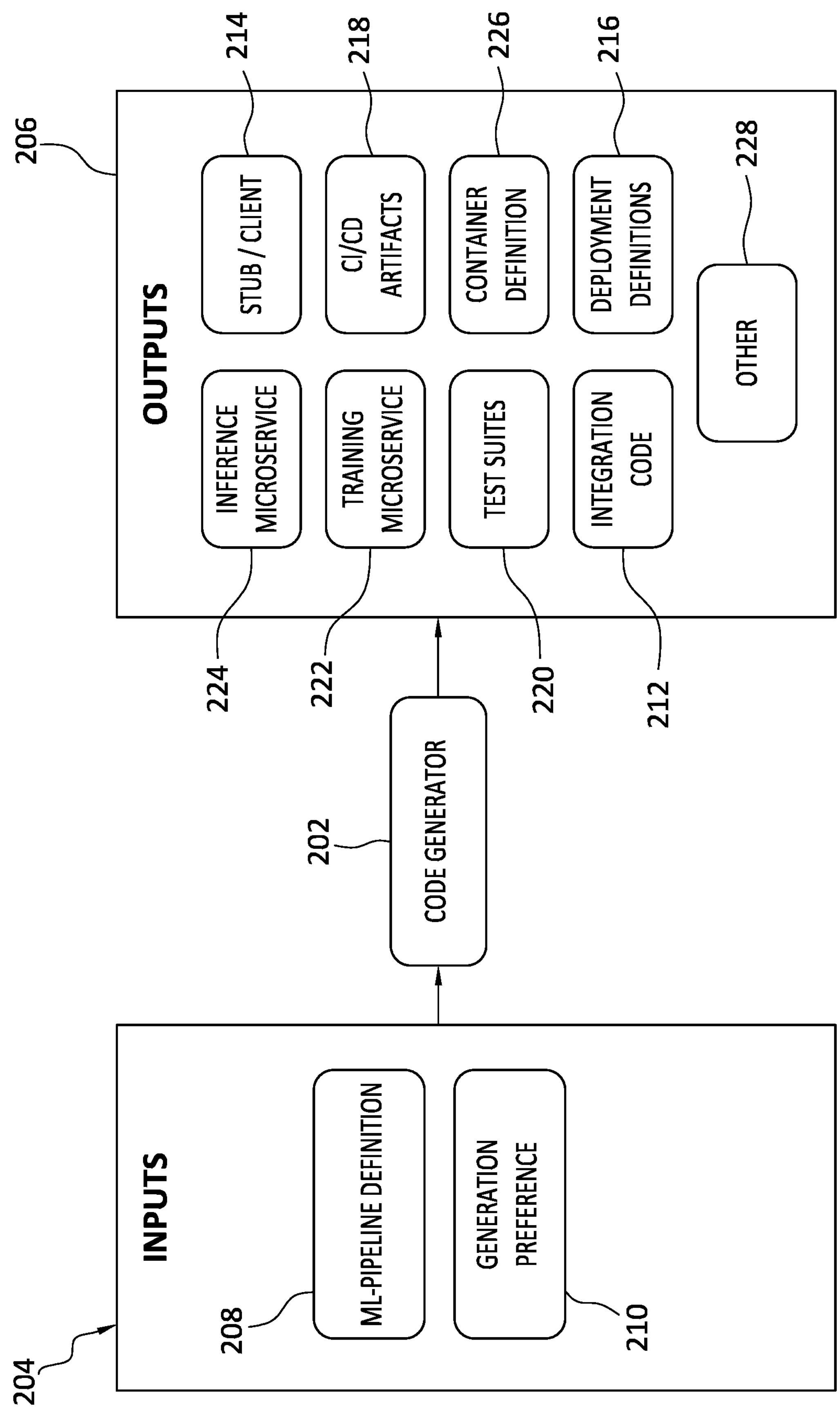
FIG. 2 discloses aspects of an example code generator.

With reference now to FIG. 2, it can be seen that when a code generator 202 according to embodiments of the invention is provided with inputs 204, a variety of outputs 206, that is, layers may be generated. Thus, in general, the output(s) 206 generated by the code generator 202 may be a function of one or more of the input(s) 202. As disclosed herein, some example inputs include an ML pipeline definition 208 and layer generation preferences 210. Some example outputs of the code generator 202 may include, for example, integration code snippets (if chosen) 212, a stub/client 214, deployment manifests with runtime metadata 216, CI/CD manifests 218, test suites 220, implementation of microservice or functions such as training 222 and inference 224, and container definition 226 (if required by the deployment platform). Finally, various other outputs 228 may be created by the code generator. Such other outputs 228 may comprise, for example, one or more microservices for performing functions relating to an ML pipeline definition that is, or will be, employed in a production environment.

Runtime Behavior.

Figure 3:
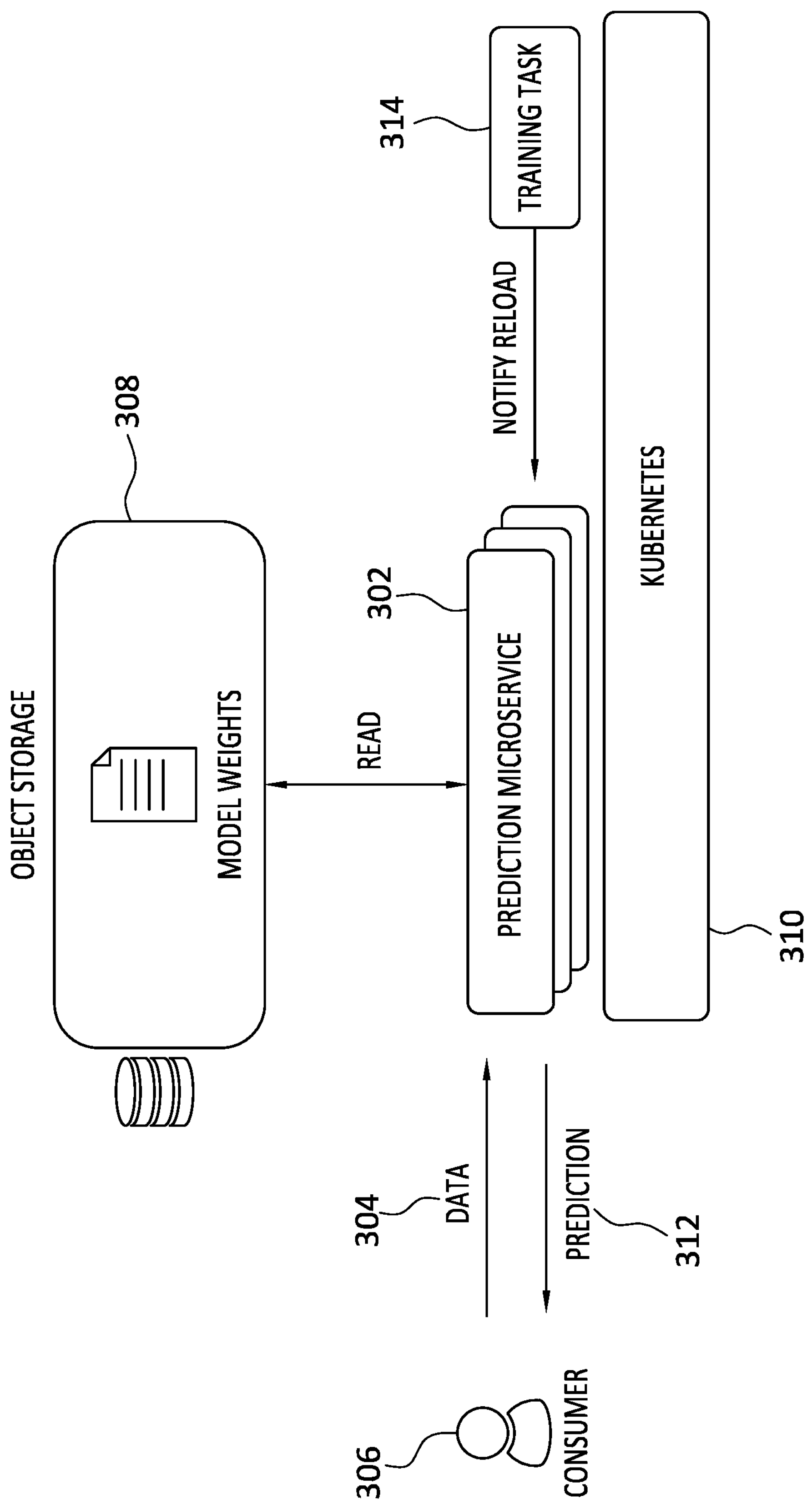
FIG. 3 discloses aspects of an example architecture involving a prediction, or inference, microservice.
Figure 4:
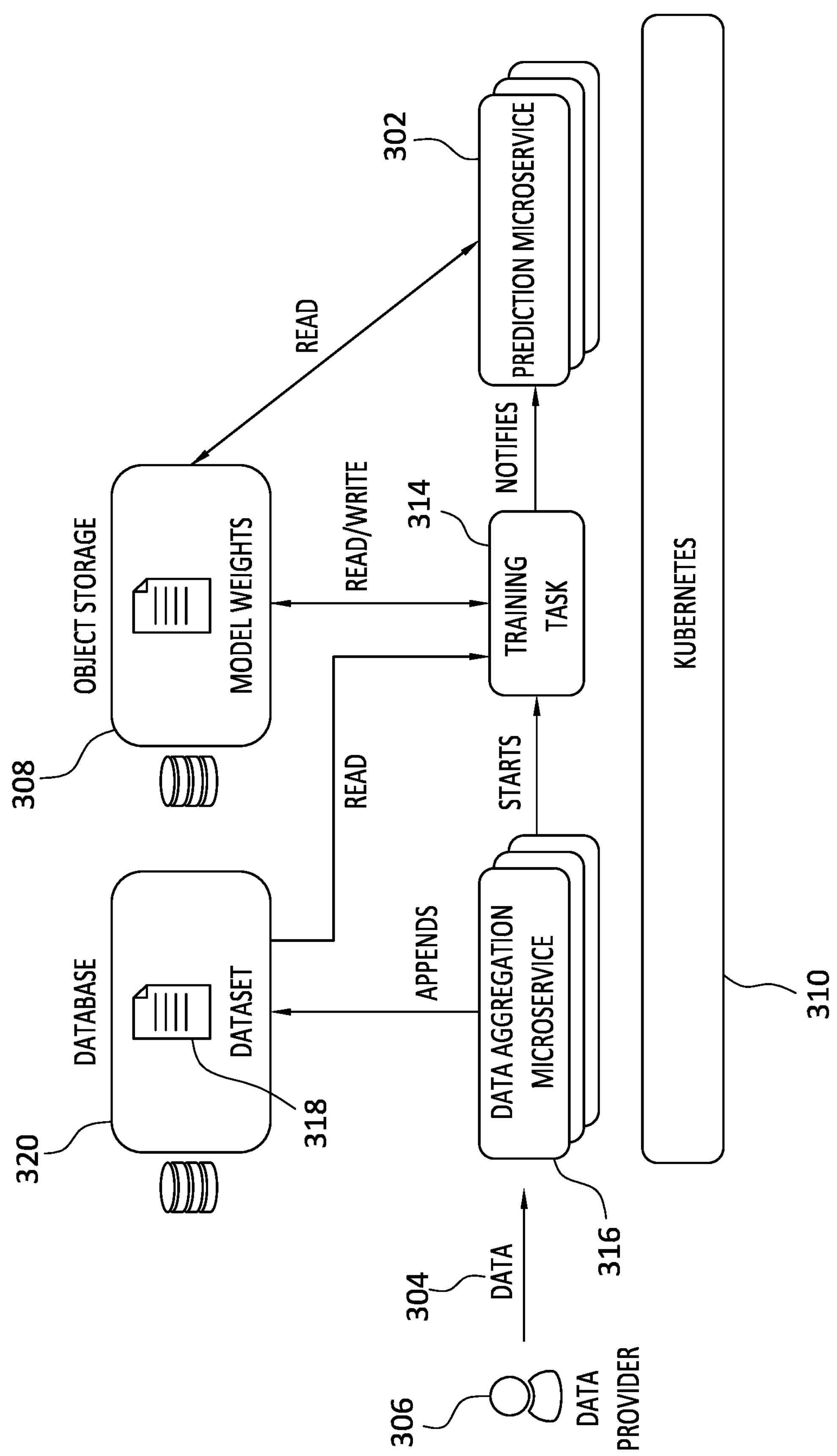
FIG. 4 discloses aspects of an example architecture for ML training of a microservice.

With reference now to FIGS. 3 and 4, details are provided concerning the runtime behavior of some example embodiments of the invention. For example, at runtime, a scheduler of a cloud native platform, or a custom scheduler, may be used to orchestrate the microservices or functions according to the metadata provided on the deployment manifest. Depending on the templates used to generate the metadata and deployment definition, different runtime architectures may be used to best fit the implementation.

Any of a wide variety of functions or microservices may be implemented by a production-ready ML model, examples of which are disclosed herein. Thus, it is noted that the example of FIG. 3, which is directed particularly to a prediction microservice, is provided only by way of example to illustrate various concepts that may be implemented by one or more embodiments of the invention, and is not intended to limit the scope of the invention in any way. A prediction, or inference, microservice may be an element of an ML model which receives user data and then uses that data as a basis to 'learn' or generate predictions about future events that may involve the user and/or the ML model.

In the example of FIG. 3, a prediction microservice 302 of an ML model may receive data 304 from one or more consumers 306, or users. The data received may be of any type. In some embodiments, the data may be generated by one or more applications which may, or may not, be hosted at a client site that is configured to communicate with a computing platform, such as a cloud native environment for example. Thus, in FIG. 3, the ML model that includes the prediction microservice 302 may operate in the cloud native environment, but that is not necessarily required and the ML model may operate in alternative environments.

The prediction microservice 302 may be scalable up or down depending upon the load imposed by the data of one or more consumers. For example, the prediction microservice 302 may create multiple instances of itself, in response to an increase in the volume of data received from the consumer(s) 306. In some embodiments, model weight information 308 may be uploaded from the prediction microservice 302 to object storage in a cloud native environment, or other environment. An orchestration system 310, such as Kubernetes for example, may be provided that orchestrates performance of the prediction microservice 302, possibly in connection with one or more other microservices. More particularly, the prediction microservice 302 may be executed on the container orchestration system 310, accept requests from Restful Webservices on/predict, and load the model from an object storage 308, as illustrated in FIG. 3. The aforementioned elements are now considered in further detail, with continued reference to FIG. 3.

As noted, the prediction microservice 302 may receive data 304 from various consumers 306 and then use that data 304, along with the model weights 308, to generate a prediction 312. For example, the data may take the form of still images and/or video stream, such as from a video camera, showing one or more human faces. The prediction microservice 302 may then process that data to generate a prediction 312 or other assessment as to whether or not the image(s) indicate the commission of a crime. Following is an illustrative process.

The process may begin when one or more consumers 306 transmit data 312 to the prediction microservice 302. The prediction microservice 302 may then be initialized, and the microservice 302 may upload model weights 308 pertaining to the received data 304.

The model weights 308 may be generated by the prediction microservice 302 based on the incoming data 304. Depending on various factors, the model weights 308 may, or may not, change often. In some embodiments, a frequency with which the model weights change may be a function of how often new data 304 is received. For example, if new data 304 is being received on an ongoing basis, the model weights 308 may change often. On the other hand, if new data 304 is only rarely received, or the data 304 is an ad hoc dataset for example, the model weights 308 may be static, or nearly so, possibly changing only once per year, for example. The model weights 308 may be used by the prediction microservice 302 to generate the prediction. To illustrate with a simple example, the prediction microservice 302 may simply transform the input data into corresponding numerical values, and then multiply the values by the model weights 308 previously generated. The resulting product (that is, numerical values X model weights) may thus serve as an indicator, that is, a prediction 312, as to the likelihood that a particular outcome will occur.

With continued reference to FIG. 3, and directing attention now to FIG. 4 as well, details are provided concerning systems and processes for the training of an ML model. As indicated, such systems and processes may involve the use of a training task 314, and data aggregation microservice 316. The data aggregation microservice 316 may append new incoming data 304 to an existing dataset 318 in a database 320.

The training task 314 may be initiated at some point after the new data 304 has been appended to the existing dataset 318. For example, depending upon the particular implementation, the training task may be executed on Kubernetes with its own metadata, that is, a runtime selection. This training task 314 may be initiated, automatically for example, based on any one or more different triggers, such as on a weekly basis, after 500 new rows of data 304 have been received and appended, or based on the type of data 304 received. The foregoing are presented only by way of example.

After initiation of the training task 314, the training task 314 may obtain the model weights 308 and appended data from the dataset 318, and then use the model weights and newly appended data from the dataset 318 to train the ML model. Upon completion of the training, the training task 314 may notify the prediction microservice 302 to refresh its model(s) to reflect the outcome of the training, where refreshment of the model may include creating and loading new model weights 308 by the prediction microservice 302. Thus, a template may be implemented with the architecture indicated in the example of FIG. 4.

D. Further Aspects of Some Example Embodiments

With continued reference to FIGS. 1-4, embodiments of the invention may comprise various useful aspects. Some examples of such aspects are discussed below.

For example, embodiments of the invention may generate code and artifacts based on user input. As such, these embodiments may accelerate a software development process while also providing full transparency of generated artifacts, so that developers and operators can make changes and customizations according to their use cases. As well, the microservices or functions generated may also gain downstream support by the test suites and CI/CD manifests generated, so that new versions and runtime orchestration may be automated. Note that as used herein, an 'artifact' may be distinct from 'code,' and some example artifacts include configuration files, which may have a variety of different formats, such as JSON or YAML for example.

In another example, embodiments of the invention may provide for generation of metadata generation that may be used to create and implement intelligent scheduling. More particularly, along with the code and artifacts, embodiments of the invention may also insert metadata into deployment manifests, which may be used for intelligent scheduling downstream. According to the metadata and the policies defined in the scheduler, an intelligent scheduler, such as at a cloud native platform for example, may be used to optimize the execution of inference and training microservices, and/or other functions across multiple dimensions, such as cost, execution speed, resource consumption, for example.

Embodiments of the invention may provide for automated transformation for ML models across execution platforms. Because at least some embodiments are template-based, users may define templates for different frameworks and platforms. As such, developers are no longer locked into a specific programming language, framework, or cloud environment. Further, when the microservices or functions need to be migrated from one environment to another, the user may simply select another generation preference to regenerate a new set of code and artifacts. If a specific template is not available, the user may define a new one and port over multiple microservices or functions.

As a further example, embodiments of the invention may implement the automation of ERP system integration. Since each ERP may require different API and coding standard, it may be time-consuming to integrate AI/ML behavior into an existing ERP system. Thus, example embodiments of the invention may generate the code snippets required to be inserted into the ERP system. Since the generation is based on templates, a pre-defined set of systems may be provided along with the implementation. Moreover, when the template of a specific ERP system is not already implemented, embodiments of the invention may enable the developers of an IT department to quickly create one and integrate multiple AI/ML behaviors into the ERP system.

With reference to a final example, embodiments of the invention may provide for coding an ML service factory instead of coding individual services. In more detail, enterprises may have trouble controlling the standard of software developed, as each development team and each developer within the enterprise has different experience and expertise. Embodiments of the invention may enable enterprises to define the templates once and define the baselines of each microservice and function implemented by each team. Not only may the enterprises save time and cost, but the IT department of the enterprise may thus have an effective way to control the quality of each microservice and function generated by the enterprise. For example, the IT department could define security and compliance policies by inserting code snippets into the templates, along with any mandatory tests, so that each microservice and function would be consistent with the policies defined by the enterprise IT department.

E. Some Example Use Cases

Attention is directed now to some example use cases for one or more embodiments of the invention. Particularly, the following examples illustrate how some example implementations of the invention may behave.

The first example concerns an end-to-end AutoML platform. Particularly, some embodiments may be implemented as a downstream consumer of AutoML frameworks. When a user defines a problem for the AutoML frameworks to solve, using input datasets, if the AutoML framework produces an adequate model, the user may have the option to continue the automated process with example embodiments of the invention to generate production-ready microservices and functions. Furthermore, the CI/CD capabilities implemented by embodiments of the invention may also be able to deploy the generated artifacts to test and production environments.

Moreover, as code and artifacts generated by example embodiments of the invention are fully transparent to the user, developers may continue to modify and customize the generated artifacts and continue to enjoy the automation and coverage offered by the test suite and CI/CD tools. When new data comes in and the ML model needs to be continuously-trained, the generated code and artifacts may still have the capabilities to re-train and update ML based on triggers defined in the template.

Another example use case concerns enterprise intelligent infrastructure for AI/ML with multi-cloud and edge capabilities. Particularly, embodiments of the invention may be embedded into an end-to-end enterprise solution with both software and hardware components. The data scientists and developers may utilize such embodiments to generate production-ready microservices or functions, while operators may be able to leverage an intelligent scheduler to orchestrate these workloads to the optimal environment, such as an internal datacenter or cloud computing environment for example that may comprise a cloud datacenter.

This end-to-end solution provided by example embodiments of the invention may have pre-defined metadata and optimal scheduling algorithm for each type of ML pipeline supported, so that the generated workload may be executed on the optimal environment. Furthermore, embodiments of the invention may also have bursting capabilities into multiple cloud service providers, in order to optimize performance across multiple performance dimensions, such as cost, speed and resource utilization, for example.

Finally, the generated inference service and, sometimes, the training service, depending on templates, may also be orchestrated to execute in an edge environment, and/or on end-devices. Depending on configuration and parameters of the edge environment or end-device, different templates may be used.

F. Example Methods

Figure 5:
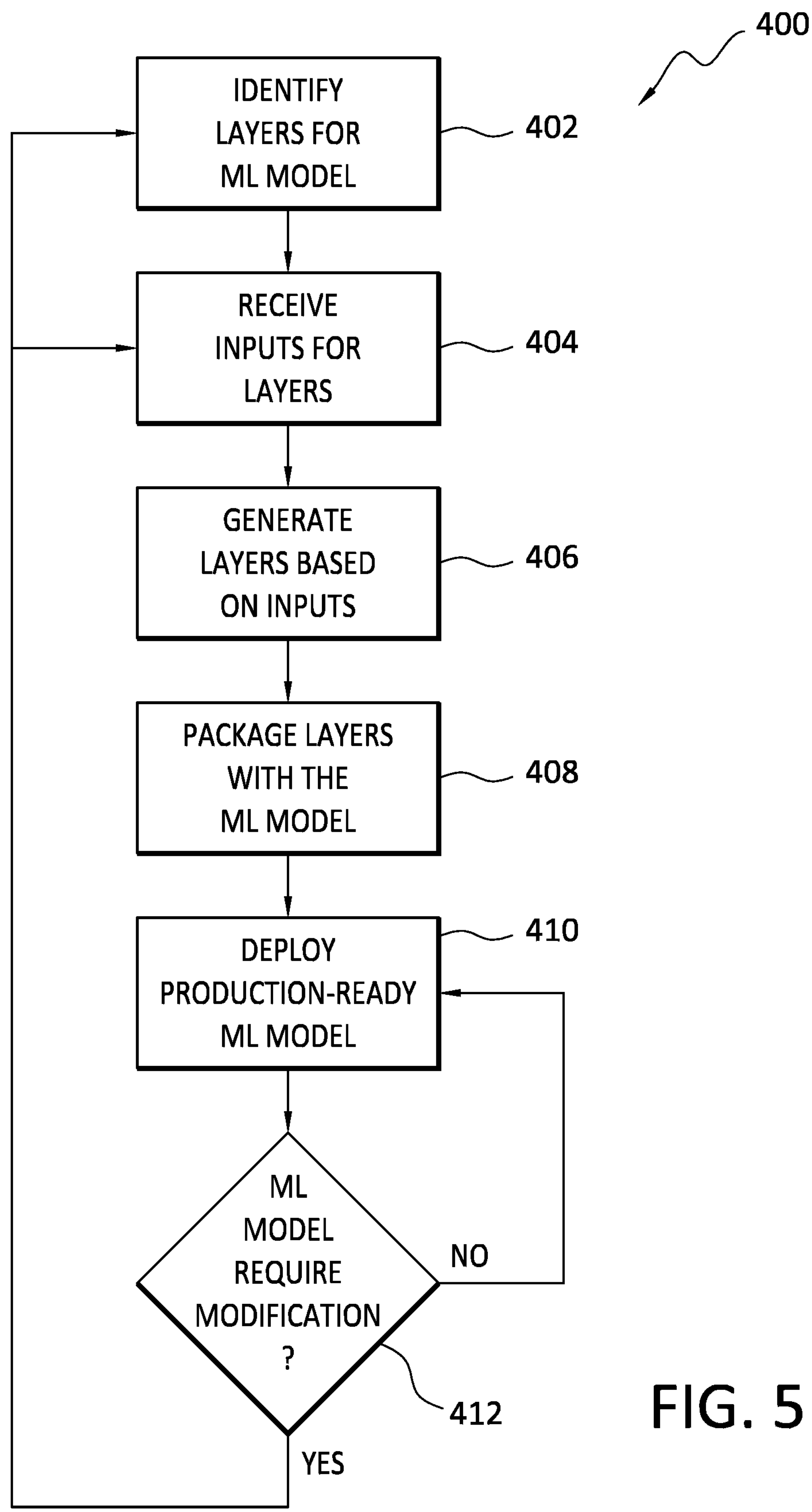
FIG. 5 discloses aspects of example methods.

With reference now to FIG. 5, details are provided concerning methods for implementing various aspects of embodiments of the invention, where one example method is denoted generally at 400. The method 400 may be implemented, in part or in whole, by an entity disclosed herein, or by any combination of disclosed entities.

The method 400 may begin with identification 402 of the layer, or layers, that are to be associated with an ML model. The ML model may be a base level ML pipeline definition that may comprise, for example, one or more algorithms, hyperparameters, and/or weights. Inasmuch as this base level ML model lacks one or more layers needed to enable its deployment in a production environment, the ML model may be considered as an incomplete, or base level, ML model. In contrast, and as disclosed herein, a production-ready ML model may comprise a base level ML model that has been packaged together, or otherwise associated with, one or more layers needed to enable deployment in a production environment.

After the layers have been identified 402, input may then be received 404 concerning one or more of the layers. Such input may comprise, for example, configuration information, performance information, and any other parameters, which, when implemented, may enable that layer to function in a production environment. In general, such inputs may comprise a respective generation preference for one or more of the identified layers. In some embodiments, input is received for all of the identified layers while, in other embodiments, no input is received for one or more of the identified layers.

With the input that has been received 404, the corresponding layers may be generated 406. In some embodiments, one or more of the layers may be generated 406 based on a template, that may be a new or modified template. In some cases, a template may be created prior to the time that the layer corresponding to that template is generated 406. In some embodiments, the input may be received 404, and/or the layers generated 406, in the order indicated in the example of FIG. 1, that is, beginning with pipeline execution and ending with the integration wrapper. In other embodiments however, no particular order of input receipt 404, or generation of layers 406, is necessary.

After the layers have been created 406, the layers may then be packaged together 408 with the base ML model. This process may result in a production-ready ML model that may then be deployed 410 to a production environment.

From time to time, a production-ready ML model may be evaluated 412 to determine if any modifications are needed. If not, that production-ready ML model may remain in a deployed status 410. On the other hand, if modifications are needed, the method may return to either or both of 402 and/or 404 to implement the modifications.

G. Further Example Embodiments

Following are some further example embodiments of the invention. These are presented only by way of example and are not intended to limit the scope of the invention in any way.

Embodiment 1. A method, comprising: receiving, as an input, an ML pipeline definition; identifying a group of layers required to be created for the ML pipeline definition; for one of more of the layers, receiving input concerning one or more characteristics of the layer; creating the layers for which input has been received; and packaging the created layers with the ML pipeline definition to create a production-ready ML model.

Embodiment 2. The method as recited in embodiment 1, wherein the production-ready ML model comprises an inference microservice.

Embodiment 3. The method as recited in embodiment 2, further comprising implementing a training microservice operable to implement ML training of the inference microservice.

Embodiment 4. The method as recited in any of embodiments 1-3, wherein the production-ready ML model is operable in a cloud native environment.

Embodiment 5. The method as recited in any of embodiments 1-4, wherein the created layers comprise a pipeline execution layer, a microservice/function wrapper layer, an input/output data transformation layer, a test suites layer, a deployment definition layer, and an integration wrapper layer.

Embodiment 6. The method as recited in any of embodiments 1-5, wherein the production-ready ML model is not constrained for use with any particular vendor.

Embodiment 7. The method as recited in any of embodiments 1-6, wherein one or more of the layers is created with a respective user-customizable template.

Embodiment 8. The method as recited in any of embodiments 1-7, further comprising creating the ML pipeline definition.

Embodiment 9. The method as recited in any of embodiments 1-8, further comprising deploying the production-ready ML model in a production environment.

Embodiment 10. The method as recited in any of embodiments 1-9, wherein one of the created layers is a microservice/function wrapper layer that specifies an inference deployment platform, a training deployment platform, and an invocation mechanism.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations, methods or processes of any one or more of embodiments 1 through 11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
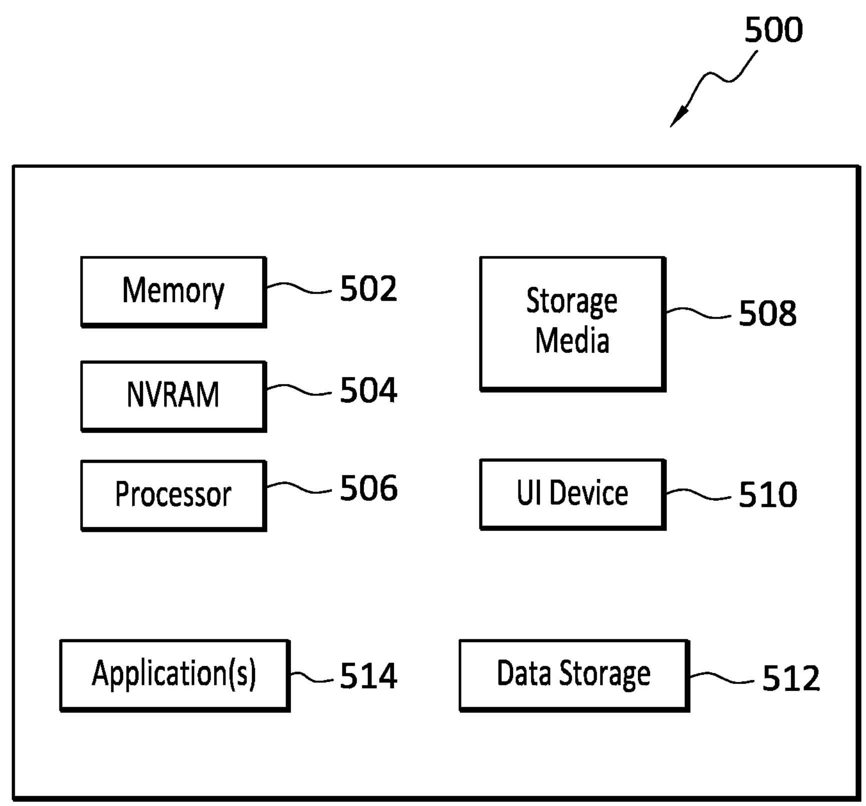
FIG. 6 discloses aspects of an example computing device for one or more embodiments of the invention.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 6.

In the example of FIG. 6, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations, processes, and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, as an input, an ML pipeline definition;

identifying a group of layers required to be created for the ML pipeline definition;

for one of more of the layers, receiving input concerning one or more characteristics of the layer;

creating the layers for which input has been received; and packaging the created layers with the ML pipeline definition to create a production-ready ML model.

2. The method as recited in claim 1, wherein the production-ready ML model comprises an inference microservice.

3. The method as recited in claim 2, further comprising implementing a training microservice operable to implement ML training of the inference microservice.

4. The method as recited in claim 1, wherein the production-ready ML model is operable in a cloud native environment.

5. The method as recited in claim 1, wherein the created layers comprise a pipeline execution layer, a microservice/function wrapper layer, an input/output data transformation layer, a test suites layer, a deployment definition layer, and an integration wrapper layer.

6. The method as recited in claim 1, wherein the production-ready ML model is not constrained for use with any particular vendor.

7. The method as recited in claim 1, wherein one or more of the layers is created with a respective user-customizable template.

8. The method as recited in claim 1, further comprising creating the ML pipeline definition.

9. The method as recited in claim 1, further comprising deploying the production-ready ML model in a production environment.

10. The method as recited in claim 1, wherein one of the created layers is a microservice/function wrapper layer that specifies an inference deployment platform, a training deployment platform, and an invocation mechanism.

11. A non-transitory storage medium having stored therein instructions that are executable by one or more hardware processors to perform operations comprising:

receiving, as an input, an ML pipeline definition;

identifying a group of layers required to be created for the ML pipeline definition;

for one of more of the layers, receiving input concerning one or more characteristics of the layer;

creating the layers for which input has been received; and packaging the created layers with the ML pipeline definition to create a production-ready ML model.

12. The non-transitory storage medium as recited in claim 11, wherein the production-ready ML model comprises an inference microservice.

13. The non-transitory storage medium as recited in claim 12, wherein the operations further comprise implementing a training microservice operable to implement ML training of the inference microservice.

14. The non-transitory storage medium as recited in claim 11, wherein the production-ready ML model is operable in a cloud native environment.

15. The non-transitory storage medium as recited in claim 11, wherein the created layers comprise a pipeline execution layer, a microservice/function wrapper layer, an input/output data transformation layer, a test suites layer, a deployment definition layer, and an integration wrapper layer.

16. The non-transitory storage medium as recited in claim 11, wherein the production-ready ML model is not constrained for use with any particular vendor.

17. The non-transitory storage medium as recited in claim 1, wherein one or more of the layers is created with a respective user-customizable template.

18. The non-transitory storage medium as recited in claim 1, wherein the operations further comprise creating the ML pipeline definition.

19. The non-transitory storage medium as recited in claim 1, wherein the operations further comprise deploying the production-ready ML model in a production environment.

20. The non-transitory storage medium as recited in claim 1, wherein one of the created layers is a microservice/function wrapper layer that specifies an inference deployment platform, a training deployment platform, and an invocation mechanism.

* * * * *